United States Patent [19]
Champeau

[11] 3,790,141
[45] Feb. 5, 1974

[54] APPARATUS FOR PRODUCING A FLOW IN A LIQUID MIXTURE

[75] Inventor: André Champeau, Paris, France

[73] Assignee: Creusot-Loire, Paris, France

[22] Filed: July 19, 1971

[21] Appl. No.: 163,765

[52] U.S. Cl................... 261/77, 261/123, 194/142, 194/143
[51] Int. Cl............................................... B01f 3/04
[58] Field of Search............... 261/77, 123, DIG. 75; 195/141-143

[56] References Cited
UNITED STATES PATENTS

| 543,411 | 7/1895 | Taylor................................. 261/77 |
| 2,077,907 | 4/1937 | Streander............................. 261/77 |
| 2,083,348 | 6/1937 | Scholler........................ 195/142 X |
| 2,123,463 | 7/1938 | Effront........................... 195/142 X |
| 2,183,943 | 12/1939 | Reich.................................. 261/21 |
| 2,188,192 | 1/1940 | Scheller......................... 195/141 X |
| 2,790,506 | 4/1953 | VanVactor....................... 261/77 X |
| 3,681,200 | 8/1972 | Ridway............................ 261/77 X |

FOREIGN PATENTS OR APPLICATIONS

| 142,610 | 5/1961 | U.S.S.R............................. 195/141 |
| 544,257 | 1/1932 | Germany............................ 261/123 |

Primary Examiner—Robert Halper
Attorney, Agent, or Firm—William B. Kerkam

[57] ABSTRACT

Apparatus for circulating a liquid mixture such as a water/paraffin mixture for aerobic fermentation, which includes a parallelepiped vessel, parallel vertical partitions spaced from the top and bottom of the vessel and defining flow paths, gas injection means at the foot of some flow paths to establish upward flow therein and guide vanes to promote flow from flow paths of one direction to the flow paths for return flow.

9 Claims, 7 Drawing Figures

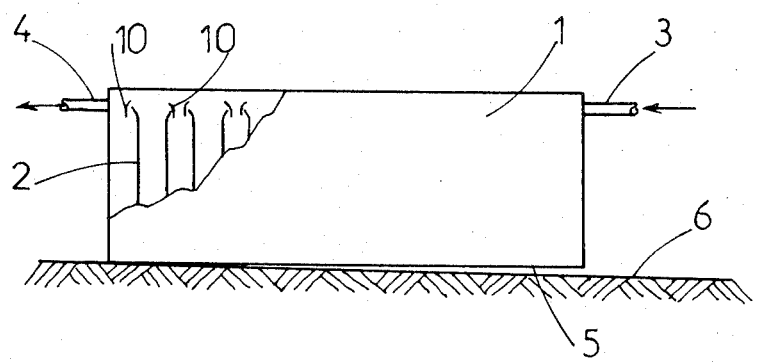
FIG:1
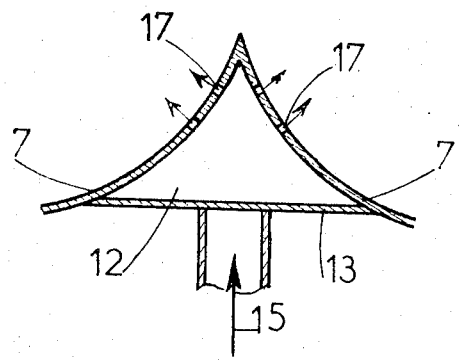
FIG:3
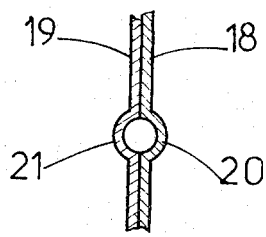
FIG:4

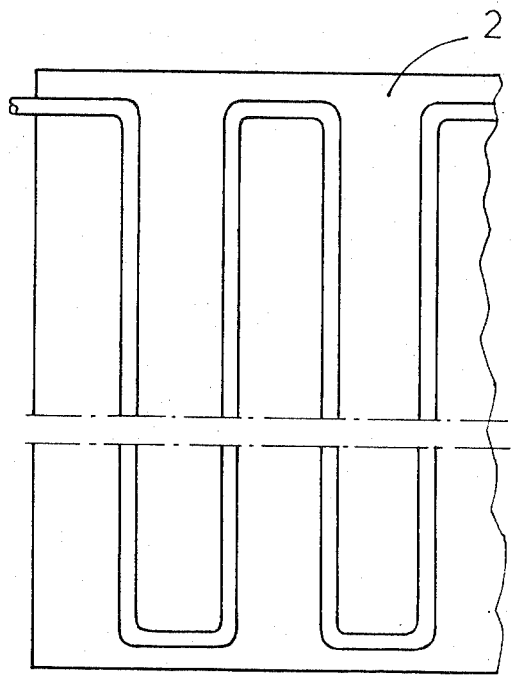
FIG: 5
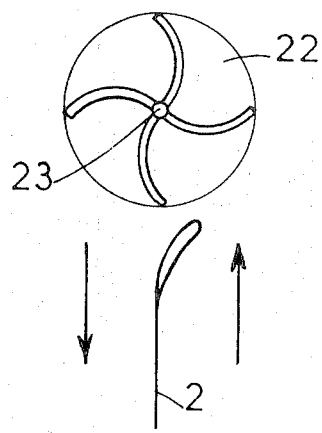
FIG: 6
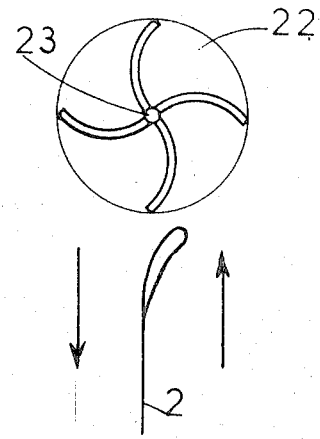
FIG: 7

APPARATUS FOR PRODUCING A FLOW IN A LIQUID MIXTURE

The invention relates to apparatus for producing a flow in a liquid mixture.

It has a particularly useful application in the manufacture of leavening agents (proteins) derived from the culture of microorganisms which feed on paraffin fractions of pertroleum. This depends on a process of aerobic fermentation in which the culture medium consists essentially of water, paraffins and various substances (mineral salts, etc.) essential to the growth of the microorganisms introduced into the medium. Air is injected into the liquid mixture to provide the oxygen required for development of the microorganisms. Obviously, apparatus embodying the invention may have other applications which involve injecting other gases, for example carbon dioxide.

In known apparatus for producing a flow in a liquid mixture, the liquid mixture flows between vertical partitions enclosed in a vessel. It is well known that gas, for example air, can be injected into the lower zone of the partitions to modify the density of the liquid, reducing this density so that the liquid rises. The liquid descends again downstream of the partitions after losing some of the injected gas.

In the case of the fermentation of micro-organisms it is very important for the speeds at which the liquid mixture flows to be greater than the speed of the mixture at which the phases, of which it is made up, will separate out. Also, the circuit must not contain any stagnant zones where solid deposits might begin to form or separation of phases might occur. Lastly, the aerobic microorganisms must have a continuous supply of the air required for their development.

According to the invention there is provided an apparatus for producing a flow in a liquid mixture, formed by at least one vessel enclosing substantially vertical partitions between which the mixture will flow vertically and comprising in its lower zone injection means for a gas such as air, the vessel being substantially parallelipipedal in form with four substantially vertical walls, the partitions being substantially parallel to one wall of the vessel and defining flat, substantially vertical spaces communicating with one another at the top and at the bottom, and upwardly concave guide surfaces having horizontal generatrices parallel to the partitions being arranged edge to edge with one another, each guide surface being placed beneath one partition to guide liquid mixture from one side of this partition to the other, the upper and lower ends of the partitions being shaped, guide vanes being provided near the free edges of the partitions to facilitate flowing of the liquid mixture, and the gas injection means being situated in the lower zone of the vessel at a site where the streams of liquid will be practically calm.

The invention will now be described in more detail with reference to particular embodiments, given by way of example and illustrated in the drawings.

FIG. 1 is an elevation of apparatus embodying the invention, part of the vertical wall of the apparatus being cut away to show the general arrangement of the internal partitions;

FIG. 3 shows part of cylindrical surfaces in the bottom of the vessel, at the place where they form a zone to receive gas which is to be distributed into the apparatus; FIG. 3 shows a variant of the gas injection means illustrated in FIG. 2;

FIG. 4 shows a section along a line IV—IV through a variant of the apparatus with cooling circuits in the vertical partitions;

FIG. 5 is an elevation of part of a vertical partition provided with cooling circuits;

FIG. 6 shows diagrammatically the upper part of a partition which, in a particular embodiment, is surmounted by a blade-wheel with curved blades which present their concave sides in the direction of flow of the liquid, and FIG. 7 is similar to FIG. 6 but shows a variant in which the blades of the blade-wheel present their concave sides to the arriving liquid.

Figure 2:
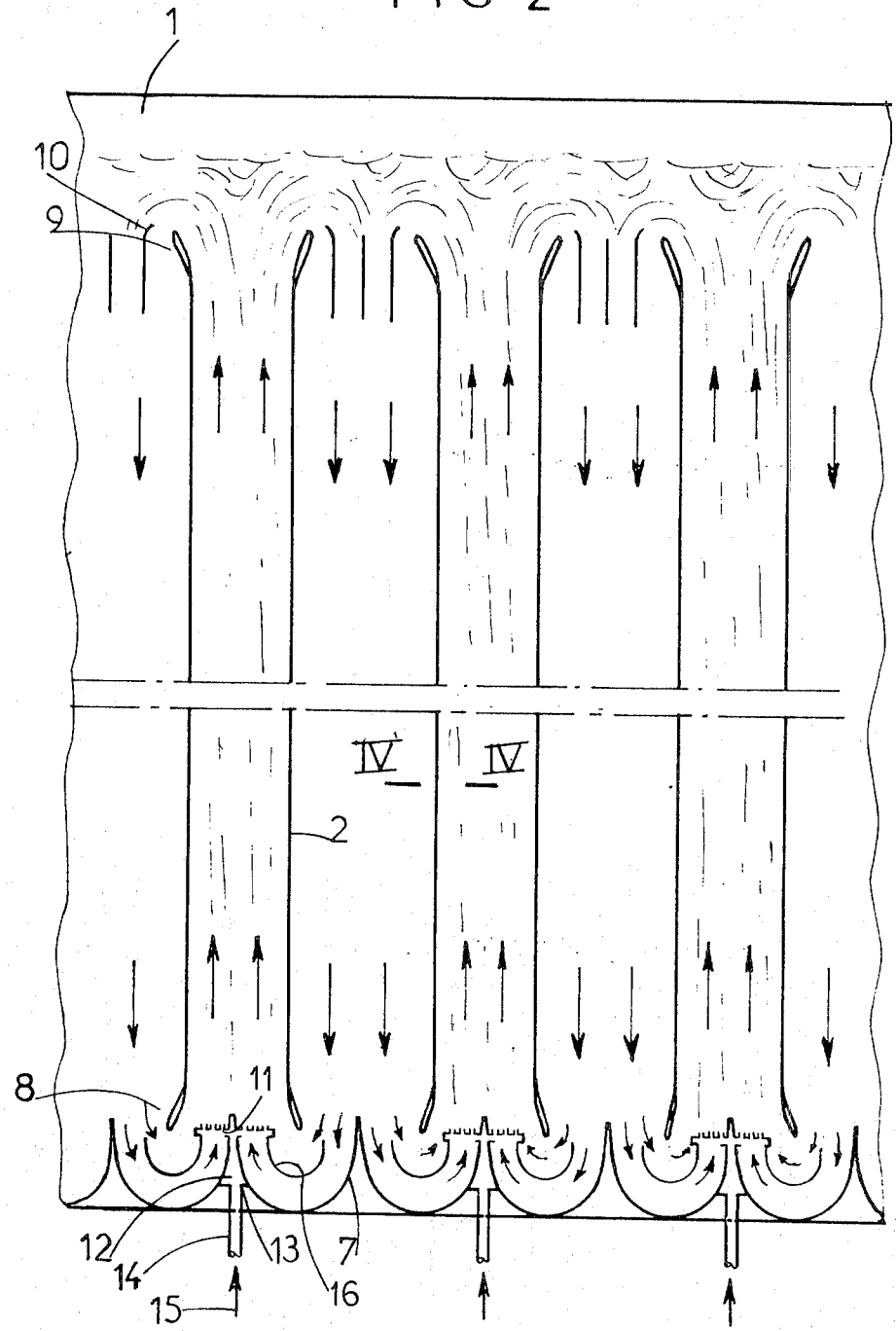
FIG. 2 shows a section through part of the apparatus shown in FIG. 1, along a vertical plane perpendicular to the partitions.

The apparatus shown in FIG. 1 is formed by a parallelipipedal vessel 1 enclosing vertical partitions 2.

This vessel is supplied with a liquid mixture. In the case of microorganism fermentation this liquid mixture comprises a suspension of these microorganisms. The mixture is introduced through a pipe 3 and, after flowing through the apparatus, is discharged through a pipe 4. To permit discharge of the mixture, the apparatus may be slightly inclined, that is to say, its bottom 5 may form a small angle with the ground 6. Alternatively, the vessel may in some cases be placed horizontally on the ground, and the liquid mixture may first be introduced, then recycled until the fermentation operation has been completed, and finally discharged once and for all through orifices not shown in FIG. 1. Either solution is possible: either a continuous flow, or fermentation by means of internal recycling, with no mixture being discharged until the end of the operation.

FIG. 2 illustrates the interior of the apparatus in more detail. It shows the partitions 2, which do not extend over the upper and lower portions of the vessel 1. Beneath the partitions lie cylindrical surface 7 with horizontal generatrices parallel to the partitions. These surface are situated beneath the lower ends of the partitions 2 and extend to each side of them. They are placed edge to edge with one another and therefore cause the stream of liquid descending in the flat space between two partitions to change direction through 180° and rise again in the next flat space, downstream of one of the partitions. The liquid must be guided satisfactorily, to avoid stagnant zones and to avoid an excessive drop in the liquid flow rate, which would cause separation of the phases of this multiphase mixture. To promote a correct flow in the potentially stagnant zone and to make the speed as constant as possible, the lower portions 8 and upper portions 9 of the partitions 2 are curved in the direction of liquid flow, and guide vanes 16 and 10 are placed in the cylindrical surfaces 7 and near the upper ends of the partitions respectively. These guide vanes ensure that the stream of liquid is correctly guided.

All the features just described enable the stream of liquid to flow with very small head losses and at moderate speeds greater than the speed at which phase separation will occur. There is no stagnant zone, and therefore there is no incipient solid deposits and no incipient phase separation.

The liquid mixture is caused to flow by injecting a gas. In the case of aerobic fermentation with microorganisms, the gas is air or a mixtue containing oxygen. In the embodiment shown in FIG. 2, the gas is injected by means of hollow cylindrical tubes 11 connected to the walls of the cylindrical surfaces 7. These cylindrical surfaces 7 form chambers 12, each closed at the bottom by a wall 13 through which a gas supply duct 14 passes. The gas enters the chambers 12 as indicated by an arrow 15 and leaves the chambers through the hollow tubes 11, from which it is distributed into the liquid through numerous small orifices. These tubes 11 may be shaped to reduce head losses in the liquid flowing in their vicinity.

Alternatively, the tubes 11 may be replaced with porous filter candles with very small orifices which feed small bubbles into the stream of liquid. The introduction of gas bubbles into the stream of liquid makes it possible to ensure aerobic fermentation of the microorganisms and also to reduce the density of the liquid mixture in order to produce an emulsion, which rises in the flat space between the two partitions above where the gas is injected. The liquid mixture containing the gas rises up in the flat space until it reaches the top, where it is partially degassed and increases in density. The mixture is then guided towards the next flat space and descends in this space until it reaches the cylindrical surfaces 7 again, which return it to the gas injection tubes, whereupon the cycle is repeated. If a continuous flow and continuous operation of the apparatus are desired, the apparatus may be slightly inclined as indicated with reference to FIG. 1, in which case the reaction mixture shifts gradually after carrying out a large number of cycles between one flat space and the next. During these cycles, the streams of liquid are guided very satisfactorily by the surfaces 7, the upper and lower partition portions 8 and 9, and the guide vanes 10 and 16.

The apparatus just described makes optimum use of the air, whose propulsive effect can be kept very low, just high enough to keep the speed above the phase separation speed. This enables the height of the apparatus and therefore the air injection pressure to be reduced.

FIG. 3 illustrates a variant relating to the injection of the air. In this case the chamber 12 formed by the lower partition 13 and cylindrical surfaces 7 is merely provided with orifices 17 for injecting air into the medium. This arrangement is suitable for a large number of applications.

Whatever the arrangement used, it is very important for either the air injection tubes or the orifices 17 to be sited in the lower zones of the streams of liquid, at the places where these streams are calm.

FIG. 4 illustrates a variant of the partitions shown in FIG. 2. These partitions may serve as cooling members, cooling being especially important in the case of fermentation, where it is absolutely essential to dissipate the heat produced by fermentation. A section line IV—IV has been inserted in FIG. 2 to indicate the site of the variant shown in FIG. 4. This partition 2 is formed of two walls 18 and 19 in contact with one another, the walls being pressed out at 20 and 21 so as to form ducts when superimposed on one another.

FIG. 5 shows part of a partition 2 provided with the ducts so formed when two walls are superimposed. The ducts may carry either a coolant or simply water, the heat from which is dissipated outside the apparatus.

FIGS. 6 and 7 relate to an improvement in the apparatus just described. In some cases the emulsion formed by the injection of gas into the base of a stream of liquid produces a foam at the top of this stream. This foam must be at least partly destroyed if a homogeneous mixture is to flow back down and continue on its normal cycle. To this end a blade-wheel 22 is provided above the partition separating a rising stream from the descending stream. Blade-wheels may be provided above all the partitions or above only some of the partitions. The blades of the wheel may be flat, radiating directly from the axis 23 of the wheel, or they may be curved and cylindrical. FIG. 6 shows blades with a cylindrical shape of which the convex side faces the rising stream of liquid, whereas FIG. 7 shows blades whose shape is concave where it faces this rising stream.

The blade-wheels are driven solely by the motion of the liquid, which flows as a result of the difference in density between the flat space in which it receives the gas and the flat space in which its density increases due to degassing, and in which it descends again.

Obviously, the invention is not restricted by the details of the embodiments just described. In particular, the apparatus may be formed of a plurality of vessels, substantially parallelipipedal in form and arranged in series with one another. These vessels may be placed either side by side or one above the other. In the latter case the liquid medium would pass from one to the other due to gravity and would be fed into the uppermost apparatus.

I claim:

1. Apparatus for producing a flow in a liquid mixture, formed by at least one vessel enclosing substantially vertical partitions between which the mixture will flow vertically, means for supplying liquid mixture to said vessel, means for removing liquid mixture from said vessel and comprising in its lower zone injection means for a gas, the vessel being substantially parallelipipedal in form with four substantially vertical walls, the partitions being substantially parallel to one wall of the vessel and defining flat, substantially vertical spaces communicating with one another at the top and at the bottom, and upwardly concave semi-cylindrical guide surfaces with horizontal generatrices parallel to the partitions being arranged edge to edge with one another forming the bottom of the vessel, each guide surface being placed beneath one partition and extending on each side thereof to guide the liquid mixture from one side of this partition to the other, guide vanes being provided near the free edges of the partitions to facilitate flow of the liquid mixture, and said gas injection means comprising chambers situated beneath the junction of two adjacent guide surfaces, a duct connect to a gas source opening into said chambers and each of said chambers communicating with gas outlet means adjacent said chambers.

2. Apparatus as claimed in claim 1, at least one partition enclosing a cooling circuit.

3. Apparatus as claimed in claim 1, the distance between two neighbouring partitions, the distance between the guide vanes and the partitions, and the vertical cross-section of the guide vanes providing a substantially constant speed of the liquid mixture.

4. Apparatus as claimed in claim 1, said gas injection means including tubes and orifices in said tubes communicating with a gas inlet.

5. Apparatus as claimed in claim 4, said tubes being porous.

6. Apparatus as claimed in claim 1, including above the partitions blade-wheels, radial blades for said wheels, horizontal rotational axes parallel to the partitions for said wheels, said blades being curved and having horizontal generatrices parallel to the partitions.

7. Apparatus as claimed in claim 6, the concave sides of said blades facing the direction of the ascending liquid mixture.

8. Apparatus as claimed in claim 6, the convex sides of said blades facing the direction of the ascending liquid mixture.

9. Apparatus as claimed in claim 1, said vessel being inclined relative to a horizontal plane, the edge of the dihedron formed by the bottom of said vessel and by the horizontal plane being parallel to said partitions.

* * * * *

UNITED STATES PATENT OFFICE
CERTIFICATE OF CORRECTION

Patent No. 3,790,141          Dated February 5, 1974

Inventor(s) Andre Champeau

It is certified that error appears in the above-identified patent and that said Letters Patent are hereby corrected as shown below:

The claim of priority was omitted. It should read

-- France PV 70-28154 July 30, 1970 --.

Signed and sealed this 17th day of September 1974.

(SEAL)
Attest:

McCOY M. GIBSON JR.
Attesting Officer

C. MARSHALL DANN
Commissioner of Patents